(12) United States Patent
Hampel

(10) Patent No.: US 6,332,271 B1
(45) Date of Patent: Dec. 25, 2001

(54) METHOD FOR MAKING ROTORS

(75) Inventor: Kurt Hampel, Obernkirchen (DE)

(73) Assignee: Joh. Heinr. Bornemann GmbH, Obernkirchen (DE)

( * ) Notice: Subject to any disclaimer, the term of this patent is extended or adjusted under 35 U.S.C. 154(b) by 0 days.

(21) Appl. No.: 09/579,458

(22) Filed: May 26, 2000

(30) Foreign Application Priority Data

May 28, 1999 (DE) .............................. 199 24 616

(51) Int. Cl.$^7$ ...................................... B23P 15/00
(52) U.S. Cl. .................. 29/888.02; 29/888.023; 29/558; 418/201.1; 418/195
(58) Field of Search ............. 29/888.023, 888.02, 29/557, 558; 418/201.1, 195, 1; 409/65, 131

(56) References Cited

U.S. PATENT DOCUMENTS

| | | | |
|---|---|---|---|
| 3,247,580 | * | 4/1966 | Sennet ............... 29/888.023 |
| 4,109,362 | * | 8/1978 | Ingalls ............... 29/888.023 |
| 5,377,407 | * | 1/1995 | Takahashi et al. ....... 29/888.023 |
| 5,669,765 | | 9/1997 | Moller et al. ................. 418/1 |
| 5,970,611 | * | 10/1999 | Takabe et al. .......... 29/888.023 |
| 6,098,266 | * | 8/2000 | Kirsten .............. 29/888.023 |
| 6,122,824 | * | 9/2000 | Jensen .............. 29/888.023 |

FOREIGN PATENT DOCUMENTS

| | | |
|---|---|---|
| 38 19 415 | 12/1989 | (DE) . |
| 42 24 969 | 7/1992 | (DE) . |

OTHER PUBLICATIONS

Koenigsberger et al., Rotorfertigung fuer Schraubenkompressoren, Werkstatt unfd Betrieb 114 (1981) pp. 463–465.
Kurzberichte, Wirbelmaschine fuer Schraubenverdichter-Rotoren, wt–Z. ind Fertig. (1973) Nr. 10 (1973) pp. 647–648.

\* cited by examiner

*Primary Examiner*—I Cuda-Rosenbaum
(74) *Attorney, Agent, or Firm*—Foley & Lardner

(57) ABSTRACT

A method for making rotors for screw-type machines with a plunge-cut turning method in which an approximately rectangular groove is formed approximately at a center of a work piece with trilateral machining, a groove is cut radially deeper by trilateral machining until a predetermined groove depth has been reached, the profile flanks are shaped by bilateral machining, and the groove depth is increased with a recessing tool.

3 Claims, 3 Drawing Sheets

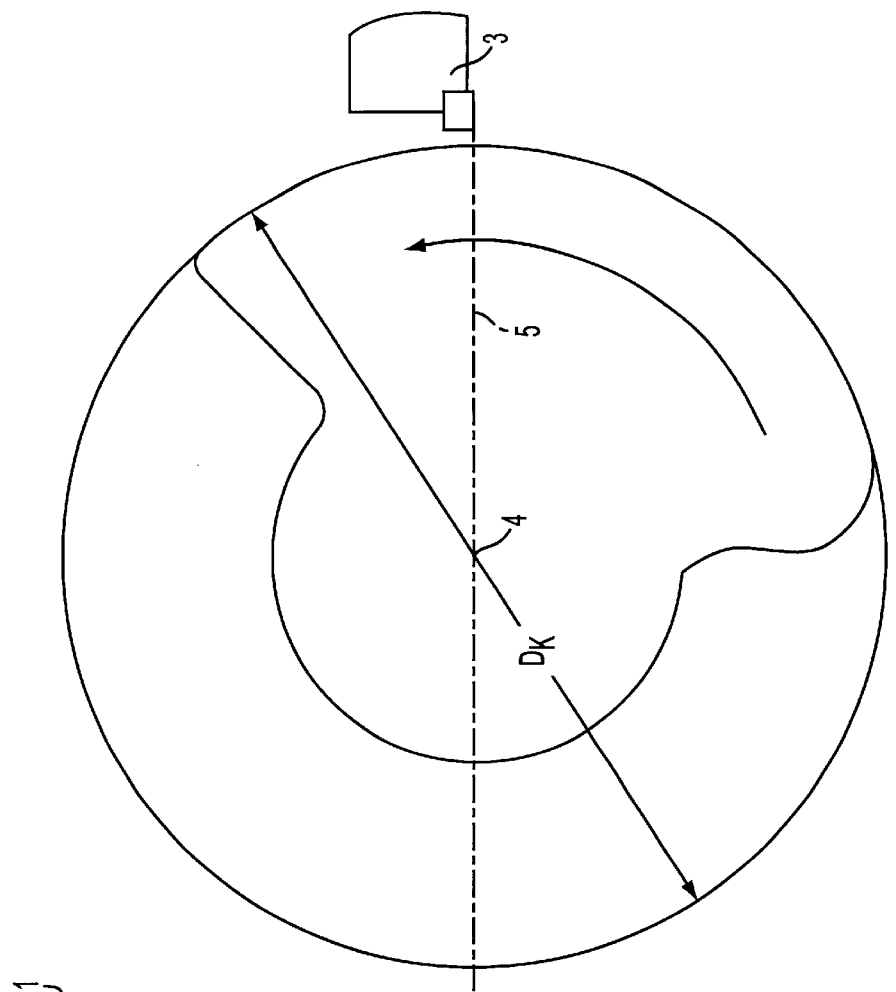
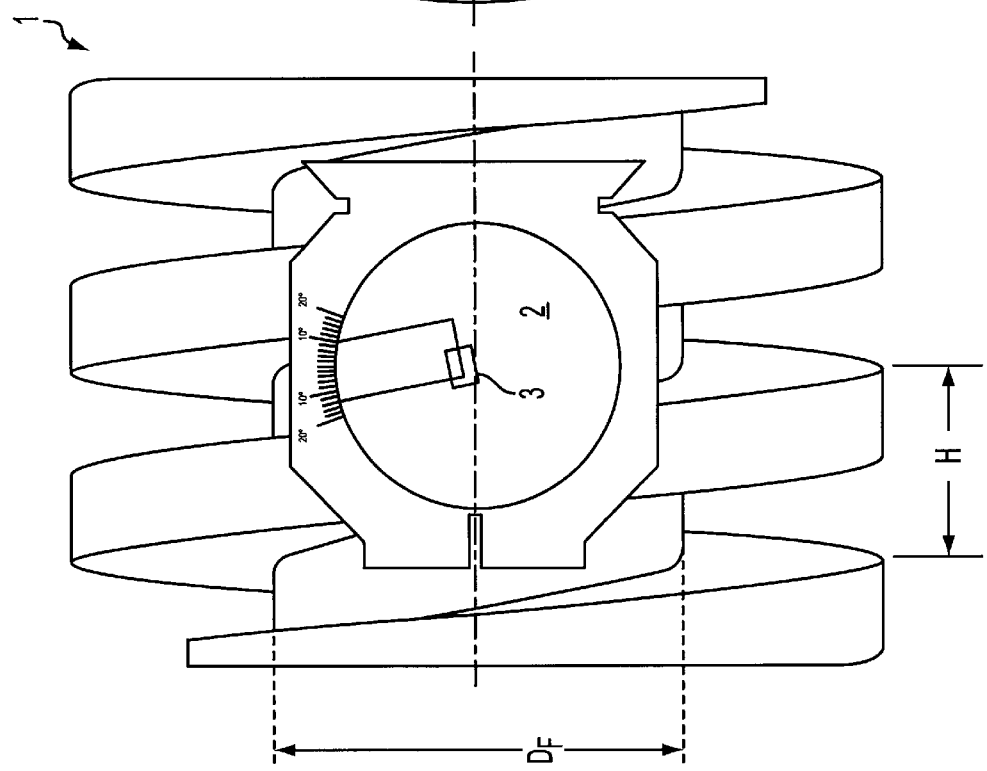
FIG. 1
FIG. 2

METHOD FOR MAKING ROTORS

BACKGROUND OF THE INVENTION

1. Field of the Invention

The invention relates to a method for making rotors for screw-type machines, in particular rotors having a large flight depth and a small pitch.

2. Description of the Related Art

In the area of machinery, screw-type machines are increasingly replacing the reciprocating-piston or gear machines hitherto used in many areas. The known piston compressor, for example, has been replaced by screw-type compressors in the industry. Similarly, screw pumps have replaced gear-type lubricating oil pumps in industrial plants.

All screw-type machines have a rotor which, in conjunction with one or more secondary rotors and/or the surrounding casing, forms closed delivery chambers into which a medium being conveyed is transported from an inlet side to an outlet side of the machine. Rotors of this type have hitherto been produced on milling or grinding machines by the hobbing method. This production method has been technically and commercially useful for rotors of screw compressors or for screw pumps for lubricating oil which have a large pitch in combination with a small flight depth and are produced in large quantities. In this case, a corresponding machining tool (profile milling cutter or formed wheel) is required for each rotor geometry (diameter, pitch, profile shape). The resulting tool costs and set-up times are acceptable for large scale production.

However, when producing rotors with a large flight depth and a small pitch which are produced individually or in very small quantities for special machines, the above-mentioned method is particularly costly, because of the tool costs and set-up times. In the case of special flank profiles, as described for a feed screw pair, e.g. in DE 42 24 969 C1, technical feasibility is limited to a considerable extent when using the above production method.

SUMMARY OF THE INVENTION

The object of the present invention is to provide an economical production method for rotors of screw-type machines, particularly for rotors with a large flight depth and a small pitch.

This object is achieved according to the invention by producing the profile geometry using a three-dimensional plunge-cut turning method for which a recessing tool for cutting a groove of rectangular cross section and respective special tools for shaping the right-hand and left-hand profile flanks are used and clamped in a holding fixture which is set about an axis of rotation, which intersects at a right angle to the work piece axis of the work piece to be machined, to the mean pitch angle of the rotor flight to be produced, and after which the following machining steps are carried out:

a first machining step, in which an approximately rectangular groove is plunge-cut approximately at the center of the profile with trilateral machining; in subsequent steps, this groove is cut radially deeper with the same recessing tool with trilateral machining until a groove depth of several millimeters has been reached; the profile flanks are then shaped by bilateral machining with the special tools mentioned, for which the plunge-cut groove serves as a tool runout; just before this profiling reaches the groove depth previously produced, this work step is ended and, instead, the groove depth is increased with the aid of the recessing tool, the previously shaped profile width now serving as a tool runout for the recessing tool; and the above-mentioned method steps are repeated until the entire profile geometry has been produced with its profile base.

The machining tools for the rectangular groove and the right-hand and left-hand profile flanks are thus preset to the mean pitch angle of the rotor flight before the beginning of production, being either rotated appropriately in their holding fixture or set appropriately together with the holding fixture.

BRIEF DESCRIPTION OF THE DRAWINGS

The following description of an exemplary embodiment contains a further explanation of the method according to the invention.

An exemplary embodiment for the use or implementation of the method according to the invention is illustrated schematically in the drawing, in which:

FIG. 1 shows a side view of a rotor to be produced by the method according to the invention, with a tool-holding fixture;

FIG. 2 shows the rotor in accordance with FIG. 1 in an end view;

DETAILED DESCRIPTION OF THE PREFERRED EMBODIMENTS

Figure 3:
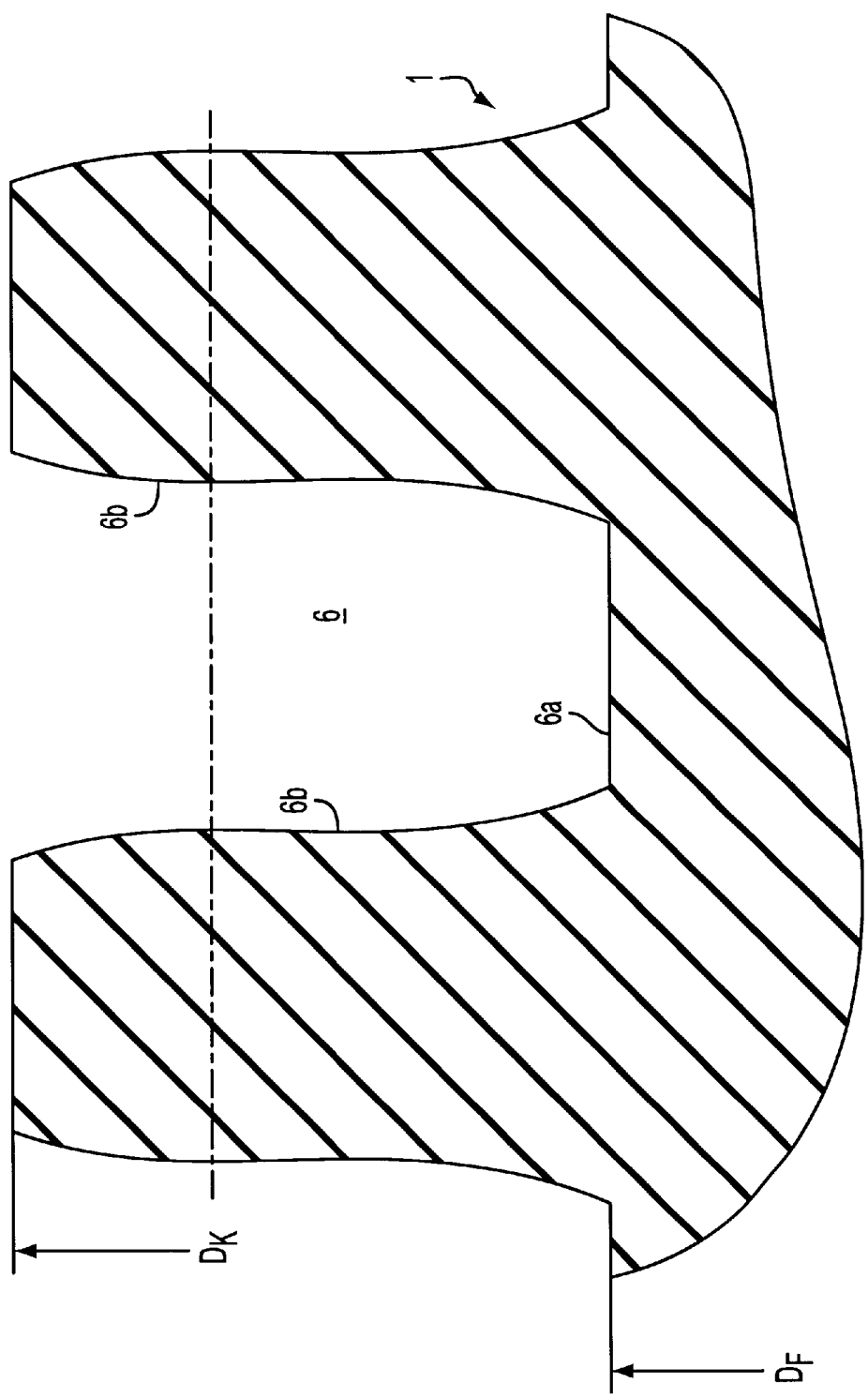
FIG. 3 shows a longitudinal section through a rotor flight with the rotor geometry to be produced according to the invention, on an enlarged scale.
Figure 4E:
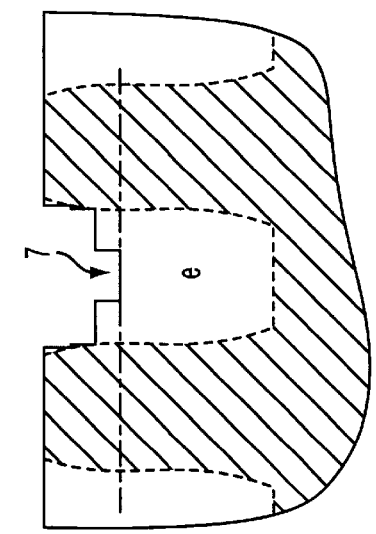
FIGS. 4(a) to (f) show the successive machining steps for the production of the rotor geometry in accordance with FIG. 3, in schematic representations.
Figure 4F:
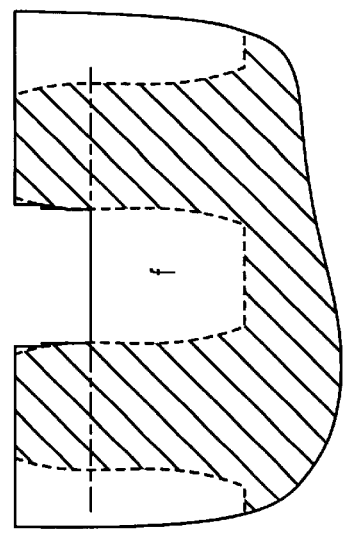
Figure 4C:
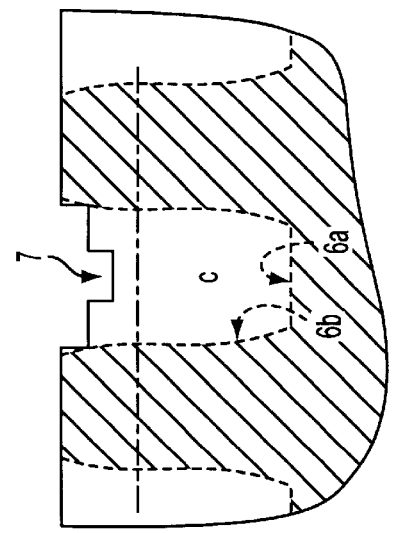
Figure 4D:
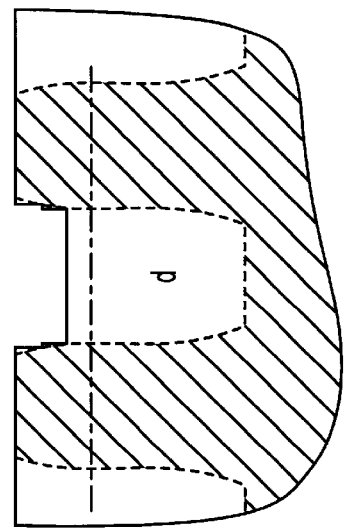
Figure 4A:
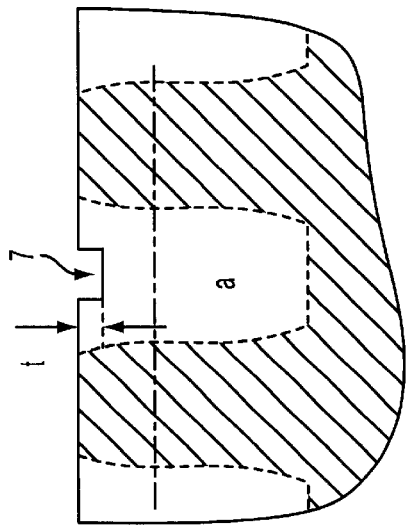
Figure 4B:
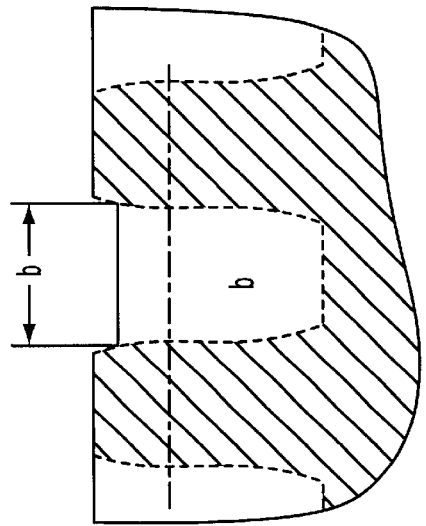

FIG. 1 shows a rotor 1 with a large flight depth and small pitch intended for a screw-type machine. Also indicated is a holding fixture 2 in which at least one of the machining tools 3 required for the production of the rotor geometry can be clamped. The holding fixture 2 can be rotated and fixed about an axis of rotation 5 which intersects at a right angle to the work piece axis 4 of the work piece to be machined. In the embodiment illustrated, the holding fixture 2 with the clamped and indicated machining tool 3 has been twisted somewhat about the axis of rotation 5, the machining tool 3 thus being set to a mean pitch angle φ of the rotor flight to be produced.

The mean pitch angle φ is calculated according to the following equation: π

$$\tan\varphi = \frac{H}{\left(\frac{D_K + D_F}{2}\right)\pi}$$

where H=Rotor pitch, $D_K$=Tip circle diameter of the rotor, and $D_F$=Root circle diameter of the rotor.

FIG. 3 shows the profile geometry 6 that can be achieved by the method of the invention. The profile base is indicated by the reference numeral 6a and defines the root circle diameter $D_F$ of the rotor 1.

FIGS. 4(a) to (f) show the successive machining steps for the production of a profile geometry 6 in accordance with FIG. 3 in a cylindrical or else solid work piece of circular cross section. In accordance with FIG. 4a, the machining begins approximately at the center of the profile with a rectangular groove 7 which is plunge-cut in steps of a few tenths of a millimeter by trilateral machining with the aid of a recessing tool until a depth of a few millimeters has been reached. The profile flanks 6b are then shaped by bilateral machining using respective special tools for the right-hand and left-hand profile flanks. In this process, the plunge-cut rectangular groove 7 serves as a tool runout (see FIG. 4b). Just before this profiling reaches the groove depth t previously produced, this work step is ended and, instead, the recessing tool is used to increase the groove depth or make a fresh cut into the now shaped profile width b (see FIG. 4c), the previously shaped profile width b now serving as a tool runout for the narrow square-nose cutting tool. These method steps are repeated (FIG. 4d, 4e, and 4f) until the entire profile geometry 6 illustrated in FIG. 3 has been produced with its profile base 6a.

Although a specific embodiment of the invention has been described in detail herein with reference to the accompanying drawings, it will be understood that the invention is not limited to this precise embodiment, and that various changes and modifications may be effected therein by one skilled in the art without departing from the scope or spirit of the invention as defined in the appended claims.

What is claimed is:

1. A method for making rotors for screw-type machines, comprising the steps of:

(a) forming an approximately rectangular groove approximately at a center of a work piece with trilateral machining;

(b) cutting the groove radially deeper by trilateral machining until a predetermined groove depth has been reached;

(c) shaping profile flanks by bilateral machining;

(d) increasing the groove depth with a recessing tool; and (e) repeating steps (a) to (d) until a profile geometry is achieved.

2. The method for making rotors for screw-type machines according to claim 1, wherein the work piece is clamped in a holding fixture which is set about an axis of rotation, which intersects at a right angle a work piece axis of the work piece to be machined, to a mean pitch angle of a rotor flight to be produced.

3. The method for making rotors for screw-type machines according to claim 1, wherein the approximately rectangular groove serves as a tool runout.

* * * * *